US009550478B2

(12) United States Patent
Kim

(10) Patent No.: US 9,550,478 B2
(45) Date of Patent: Jan. 24, 2017

(54) CONTROL METHOD FOR HILL START ASSIST CONTROL SYSTEM

(71) Applicant: Hyundai Motor Company, Seoul (KR)

(72) Inventor: Hyo Tae Kim, Ansan-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/482,985

(22) Filed: Sep. 10, 2014

(65) Prior Publication Data

US 2015/0224968 A1 Aug. 13, 2015

(30) Foreign Application Priority Data

Feb. 12, 2014 (KR) ........................ 10-2014-0015815

(51) Int. Cl.
*B60T 8/1755* (2006.01)
*B60T 7/12* (2006.01)
*B60W 30/18* (2012.01)

(52) U.S. Cl.
CPC ......... *B60T 7/122* (2013.01); *B60W 30/18118* (2013.01)

(58) Field of Classification Search
CPC combination set(s) only.
See application file for complete search history.

(56) References Cited

U.S. PATENT DOCUMENTS

| | | | |
|---|---|---|---|
| 8,315,752 B2* | 11/2012 | Kwon | B60L 15/2009 318/452 |
| 8,784,267 B2* | 7/2014 | Staudinger | B60W 30/16 477/120 |
| 9,008,924 B2* | 4/2015 | Jackson | B60W 30/18063 477/21 |
| 2005/0075775 A1* | 4/2005 | Carlson | F16H 61/0059 701/51 |
| 2005/0125107 A1* | 6/2005 | Schmidt | B60T 7/122 701/1 |

(Continued)

FOREIGN PATENT DOCUMENTS

JP 2000-168519 A 6/2000
KR 100180436 B1 12/1998

(Continued)

*Primary Examiner* — Thomas Tarcza
*Assistant Examiner* — Richard Goldman
(74) *Attorney, Agent, or Firm* — Morgan, Lewis & Bockius LLP

(57) ABSTRACT

A control method for a hill start assistant control system may include determining that the vehicle is stopped and braked; receiving a current sensing value from an acceleration sensor on the vehicle which senses acceleration and periodically outputs a sensing value with the vehicle stopped and braked; determining whether a condition for stabilizing an output of the acceleration sensor is satisfied, using the current sensing value and a previous sensing value; finding an acceleration accumulation average by accumulating the current sensing value and averaging sensing values of the acceleration sensor which are accumulated up to a current time when the condition for stabilizing the output of the acceleration sensor is not satisfied; comparing the acceleration accumulation average with an accumulation reference value; and operating the hill start assistant control system, when the acceleration accumulation average is larger than the acceleration reference value.

6 Claims, 4 Drawing Sheets

(56) References Cited

U.S. PATENT DOCUMENTS

| | | | | |
|---|---|---|---|---|
| 2008/0071459 | A1* | 3/2008 | Sokoll | B60T 7/122 701/81 |
| 2008/0195289 | A1* | 8/2008 | Sokoll | B60T 7/122 701/70 |
| 2009/0187324 | A1* | 7/2009 | Lu | B60K 31/00 701/94 |
| 2010/0017070 | A1* | 1/2010 | Doering | B60W 30/04 701/48 |
| 2011/0029172 | A1* | 2/2011 | Kwon | B60L 15/2009 701/22 |
| 2012/0109482 | A1* | 5/2012 | Yoshii | B60T 7/042 701/70 |
| 2012/0209479 | A1* | 8/2012 | Yanagida | B60T 7/122 701/51 |
| 2013/0192937 | A1* | 8/2013 | Furuyama | B60T 7/12 188/72.6 |
| 2013/0238209 | A1* | 9/2013 | Schaefers | B60T 7/122 701/70 |
| 2013/0261923 | A1* | 10/2013 | Harada | B60T 7/12 701/78 |
| 2013/0297191 | A1* | 11/2013 | Gibson | F02N 11/0855 701/112 |
| 2015/0066268 | A1* | 3/2015 | Park | B60L 15/2018 701/22 |
| 2015/0166055 | A1* | 6/2015 | Matsui | B60K 6/547 701/22 |
| 2015/0232092 | A1* | 8/2015 | Fairgrieve | B60W 30/143 701/93 |

FOREIGN PATENT DOCUMENTS

| | | |
|---|---|---|
| KR | 10-2003-0027402 A | 4/2003 |
| KR | 10-2004-0095476 A | 11/2004 |
| KR | 10-2007-0049877 A | 5/2007 |
| KR | 10-2013-0138013 A | 12/2013 |

\* cited by examiner

[right after stopping on hill]

CONTROL METHOD FOR HILL START ASSIST CONTROL SYSTEM

CROSS-REFERENCE TO RELATED APPLICATION

The present application claims priority to Korean Patent Application No. 10-2014-0015815 filed Feb. 12, 2014, the entire contents of which is incorporated herein for all purposes by this reference.

BACKGROUND

Field of the Invention

The present invention relates to a control method for hill start assistant control system, and more particularly to a control method of operating a hill stat assistant control system without an error in a pitching motion of a vehicle due to sudden stop by normally recognizing a hill even when the vehicle starts after sudden stopping.

Description of Related Art

A driver takes a foot off the brake pedal and presses down the acceleration pedal to start a vehicle stopped on a hill (uphill road), in which the vehicle may be pushed down the hill due to the deficit of driving force.

Accordingly, a hill start assistant control system (hereafter, referred to as a 'HAC') that prevents a vehicle from being pushed back by sensing that the vehicle is pushed back with wheel speed sensors on the wheels and by generating a braking force on the wheels with a brake system when the vehicle stopped on a hill is started, has been disclosed.

The HAC, which is a system that applies a braking force on wheels until the power from an engine increases after recognizing a hill and then removes the braking force, operates when it recognizes a predetermined level or higher of inclination in stopping of a vehicle or in braking in which a driver presses down a brake pedal.

A longitude acceleration sensor is used in the HAC to measure an inclination and the controller of the HAC determines and recognizes a hill with a predetermined level or higher inclination, using the sensed value of the longitude acceleration sensor (hereafter, abbreviated as 'acceleration sensor').

Basically, acceleration sensors, as shown in FIG. 1, output 0 as an acceleration value that is sensed when a vehicle runs at a constant speed on level ground and they output + and − acceleration values when a vehicle decelerates on a level ground.

Further, acceleration sensors output + and − acceleration values even when a vehicle runs at a constant speed or stops on a hill (uphill road) and a downhill road (downward slope), and they output acceleration values higher in absolute value when a vehicle accelerates on a hill or a downhill road, as compared with when it runs at a constant or stops.

A pitching motion of a vehicle is generated, as shown in FIG. 2, right after the vehicle suddenly stops, in which the output values of acceleration sensors fluctuate around the value corresponding to the actual inclination until the values are stabilized.

As described above, the actual inclination is not accurately reflected when whether a HAC operates is determined, so the HAC does not normally operate in some cases, when a vehicle starts after suddenly stopping on a hill.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method that can normally recognize a hill from an output value from an acceleration sensor even after the vehicle suddenly stops.

Further, another object of the present invention is to provide a control method that enables a hill start assistant control system to normally operate without an error in a pitching motion of a vehicle due to sudden stop.

In an aspect of the present invention, a control method for a hill start assistant control system which prevents a vehicle from being pushed back by generating a braking force with a brake system when the vehicle starts after stopping on a hill, may include (a) determining that the vehicle is stopped and braked; (b) receiving a currently sensed vehicle acceleration value from an acceleration sensor on the vehicle which senses acceleration and periodically outputs a sensed vehicle acceleration value with the vehicle stopped and braked; (c) determining whether a condition for stabilizing an output of the acceleration sensor is satisfied, using the currently sensed sensing value and a previously sensed vehicle acceleration value; (d) finding an acceleration accumulation average by accumulating the currently sensed value and averaging sensing values of the acceleration sensor which are accumulated up to a current time when the condition for stabilizing the output of the acceleration sensor is not satisfied; (e) comparing the acceleration accumulation average with an acceleration reference value; and (f) operating the hill start assistant control system, when the acceleration accumulation average is larger than the acceleration reference value.

The condition for stabilizing the output of the acceleration sensor in the step (c) is that a difference between the currently sensed value and the previously sensed value is within a predetermined tolerance.

The method may further include finding the acceleration accumulation average by accumulating the sensed values from the acceleration sensor and averaging the accumulated sensed values, by repeating the steps of (b), (c), and (d) until a predetermined number of cycles has taken place.

When the condition for stabilizing the output of the acceleration sensor is satisfied in the step (c), the currently sensed value is compared with the acceleration reference value, and when the currently sensed value is larger than the acceleration reference value with the vehicle braked, the hill start assistant control system is operated.

Therefore, according to the control method for a hill start assistant control system, the hill start assistant control system can normally operate, when necessary, through the process of recognizing a hill from the acceleration accumulation average and determining the condition for operating the HAC, even when a vehicle starts after stopping on the hill.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
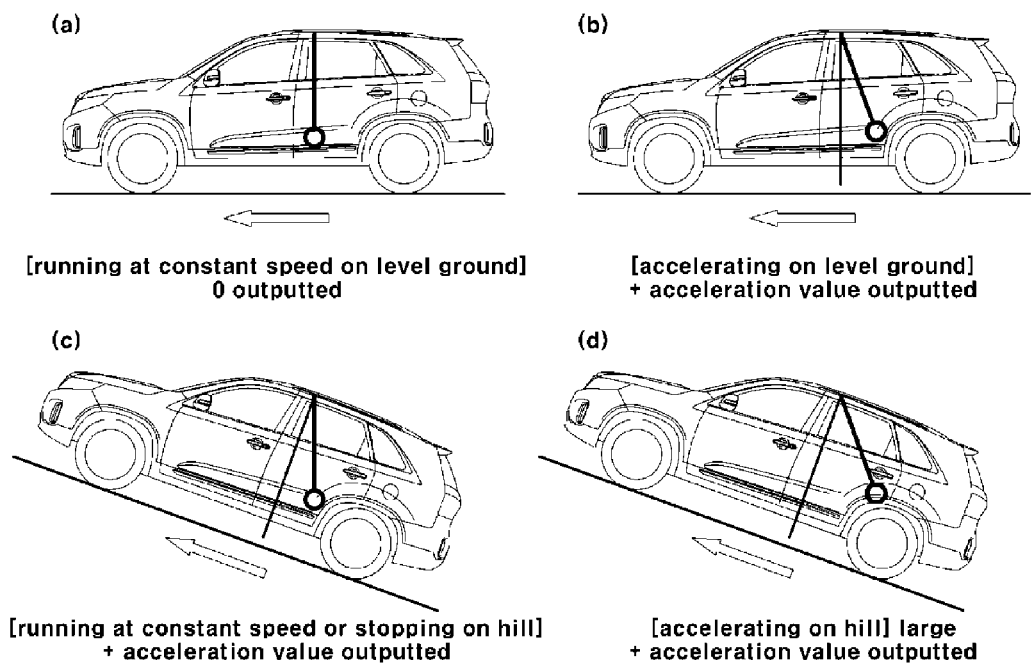
FIG. 1 is a view illustrating sensed values from an acceleration sensor.
Figure 2:
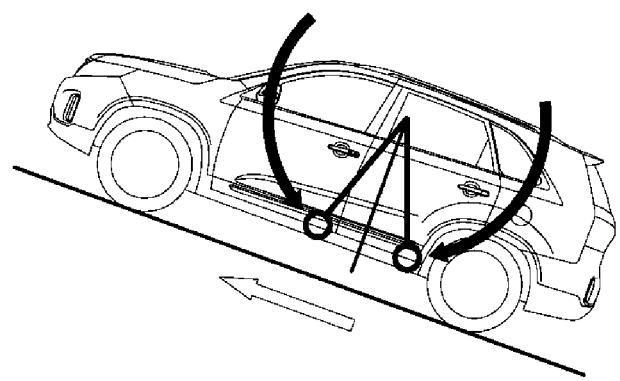
FIG. 2 is a view illustrating a pitching motion of a vehicle after sudden stop on a hill.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described more fully with reference to the accompanying drawings for those skilled in the art to easily implement the present invention.

Figure 3:
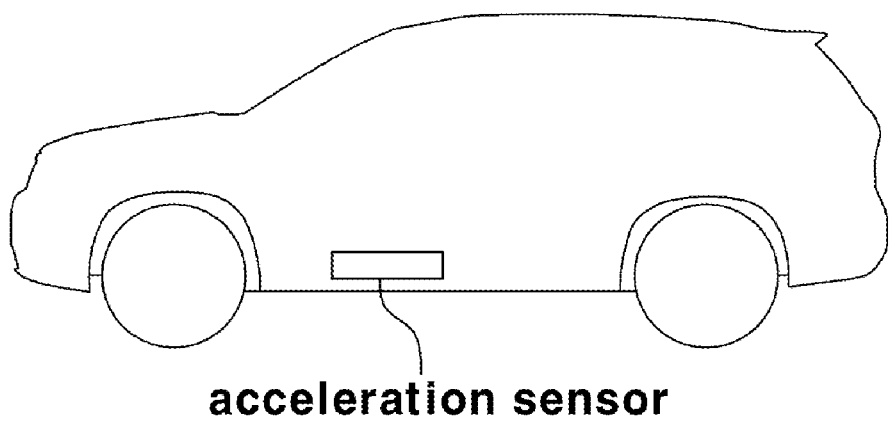
FIG. 3 is a view illustrating an acceleration sensor mounted in a vehicle according to an exemplary embodiment of the present invention.

The present invention has been designed to provide a method that can normally recognize a hill from an output value from an acceleration sensor as shown in FIG. 3 even right after a vehicle suddenly stops and that enables a hill start assistant control system (hereafter, referred to as a 'HAC') to normally operate without an error in a pitching motion of a vehicle due to sudden stop.

To this end, the present invention is mainly characterized in that it recognizes the average of accumulated output values (longitude acceleration values sensed) from an acceleration sensor after a vehicle stops, as an inclination (uphill inclination) on a hill.

That is, the present invention operates an HAC of a vehicle earlier by accumulating output values from an acceleration sensor fluctuating right after the vehicle stops and recognizing the average of the accumulated output values (hereafter, referred to as an 'acceleration accumulation average'). Further, when the output values from the acceleration sensors are stabilized and a constant value sensed is outputted, it uses the value as an inclination for determining whether to operate the HAC.

Figure 4:
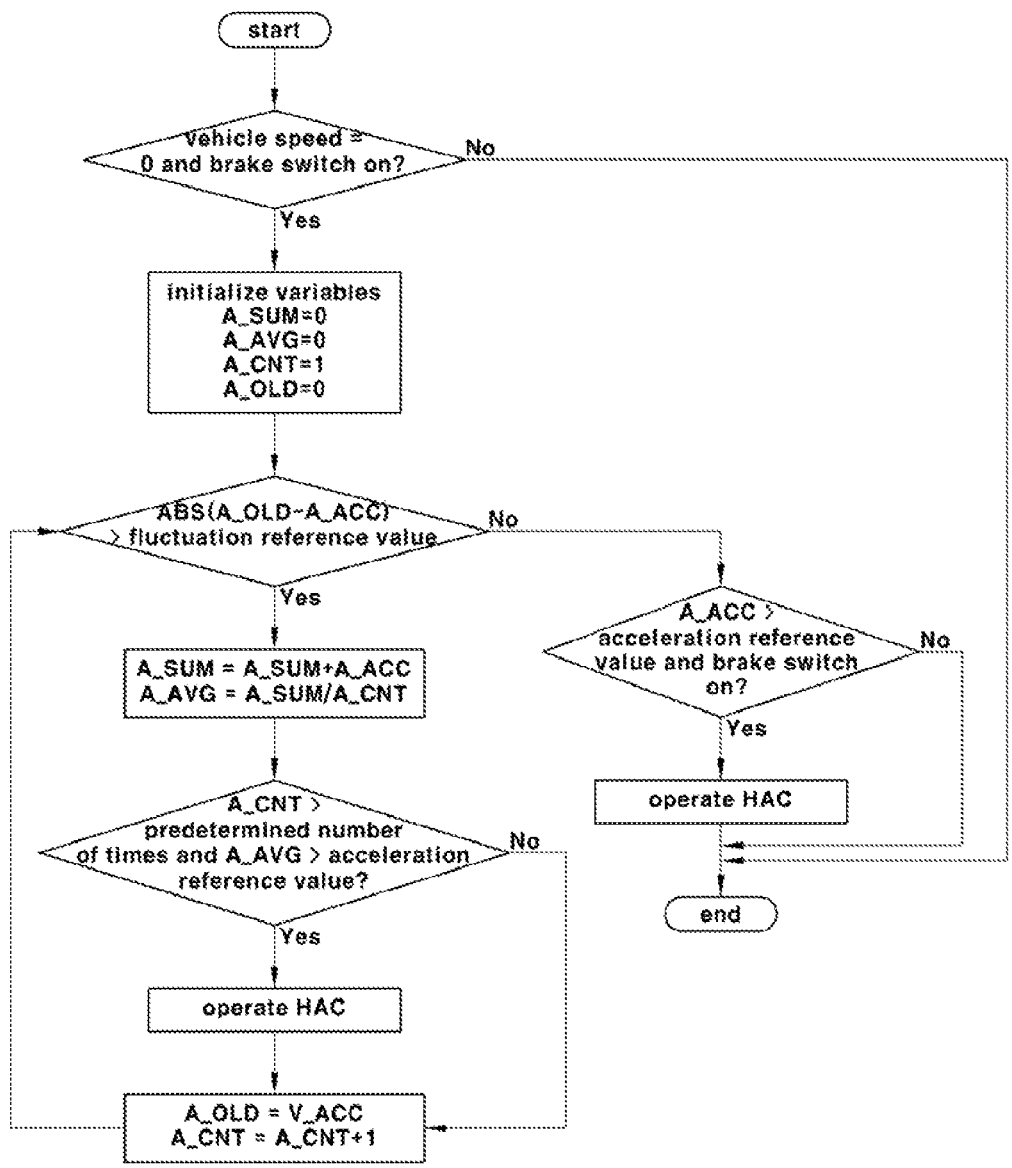
FIG. 4 is a flowchart illustrating a control method of a hill start assistant control system according to an exemplary embodiment of the present invention.

FIG. 3 is a view illustrating the acceleration sensor mounted in a vehicle according to an exemplary embodiment of the present invention and FIG. 4 is a flowchart illustrating an HAC control method according to an exemplary embodiment of the present invention.

In FIG. 3, 'A_SUM' means an acceleration accumulation value obtained by accumulating output values from an acceleration sensor when a vehicle is stopped or braked, and 'A_AVG' means an acceleration accumulation average.

Further, 'A_CNT' means the number of times of accumulating sensor output values, 'A_OLD' means a previous sensor output value (that is, a previously sensed vehicle acceleration value), and 'A_ACC' means an output value (that is, the currently sensed vehicle acceleration value) from the acceleration sensor.

First, a driver determines whether a vehicle is braked (brake switch is turned on) by pressing down a brake pedal with the vehicle stopped on a hill.

Next, the method initializes, by a controller, the variables such as the acceleration accumulation value, the acceleration accumulation average, the number of times of accumulation, and the previously sensed acceleration value and determines whether the output of the acceleration sensor has been stabilized from the currently sensed output value and the previously sensed output value from the acceleration sensor.

That is, the method determines, by the controller, the output state of the sensor, using the currently sensed acceleration value (inclination) and the sensed acceleration value and determines whether to operate the HAC, using the currently sensed acceleration value when the difference between the currently sensed acceleration value and the previously sensed acceleration value is a fluctuation reference value or less.

The method by the controller operates the HAC, when the currently sensed acceleration value is larger than a predetermined acceleration reference value and it is in a braking system in which a driver presses down the brake pedal (a brake switch is turned on).

As described above, when an output stabilization condition is satisfied after it is checked whether the output of the acceleration sensor has been stabilized in an exemplary embodiment of the present invention, that is, when the difference between the currently sensed acceleration value and the previously sensed acceleration value is the fluctuation reference value or less, the method determines whether to operate the HAC, using the currently sensed acceleration value.

In contrast, when the difference between the currently sensed acceleration value and the previously sensed acceleration value is larger than the fluctuation reference value, the method accumulates the currently sensed acceleration values and takes the average and finds the acceleration accumulation average by accumulating the acceleration values, which are periodically taken, until a predetermined number or times is reached.

When the predetermined number or times is not reached, the method updates the currently sensed acceleration value with the previously sensed acceleration value, counts the number of accumulation times, and then repeats the process of checking whether the stabilization has been made, accumulating acceleration, determining an average, and comparing acceleration value with the acceleration reference value.

When the acceleration accumulation average, that is the average of the acceleration values accumulated by the predetermined number of times, is found, the method compares the predetermined acceleration reference value with the acceleration accumulation average, and when the acceleration accumulation average is larger than the acceleration reference value that is the condition for operating the HAC, the method operates the HAC.

The acceleration reference value is set in advance as a longitude acceleration value corresponding to an inclination where the HAC needs to operate and is tuned through a previous test, depending on the kind of vehicles.

Further, the predetermined number of times may be appropriately tuned, depending on a communication environment for transmitting the output values from the acceleration sensor.

As described above, according to the control method for a hill start assistant control system, the HAC can normally operate, when necessary, through the process of recognizing a hill from the acceleration accumulation average and determining the condition for operating the HAC, even when a vehicle starts after stopping on the hill.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a hill start assistant control system which prevents a vehicle from being pushed back by generating a braking force with a brake system when the vehicle starts after stopping on a hill, the method comprising:
   (a) determining, by a controller, that the vehicle is stopped and braked;
   (b) receiving, by the controller, a currently sensed vehicle acceleration value from an acceleration sensor on the vehicle which senses acceleration and periodically outputs the currently sensed vehicle acceleration value with the vehicle stopped and braked;
   (c) determining, by the controller, whether a condition for stabilizing an output of the acceleration sensor is satisfied, using the currently sensed vehicle acceleration value and a previously sensed vehicle acceleration value;
   (d) finding an average acceleration, by the controller, by accumulating the currently sensed vehicle acceleration value and averaging sensed vehicle acceleration values of the acceleration sensor which are accumulated up to a current time when the condition for stabilizing the output of the acceleration sensor is not satisfied;
   (e) comparing the average acceleration with an acceleration reference value, by the controller; and
   (f) operating the hill start assistant control system, by the controller, when the average acceleration is larger than the acceleration reference value.

2. The method of claim 1, wherein the condition for stabilizing the output of the acceleration sensor in the step (c) is that a difference between the currently sensed vehicle acceleration value and the previously sensed vehicle acceleration value is within a predetermined tolerance.

3. The method of claim 1, further including:
   finding the average acceleration, by the controller, by accumulating the sensed vehicle acceleration values from the acceleration sensor and averaging the accumulated sensed vehicle acceleration values, by repeating the steps of (b), (c), and (d) until a predetermined number of cycles has taken place.

4. The method of claim 3, wherein the condition for stabilizing the output of the acceleration sensor in the step (c) is that a difference between the currently sensed vehicle acceleration value and the previously sensed vehicle acceleration value is within a predetermined tolerance.

5. The method of claim 1, wherein when the condition for stabilizing the output of the acceleration sensor is satisfied in the step (c), the currently sensed vehicle acceleration value is compared with the acceleration reference value, and when the currently sensed vehicle acceleration value is larger than the acceleration reference value with the vehicle braked, the hill start assistant control system is operated.

6. The method of claim 5, wherein the condition for stabilizing the output of the acceleration sensor in the step (c) is that a difference between the currently sensed vehicle acceleration value and the previously sensed vehicle acceleration value is within a predetermined tolerance.

* * * * *